United States Patent
Jakobsmeyer

(10) Patent No.: US 10,543,774 B2
(45) Date of Patent: Jan. 28, 2020

(54) ADJUSTMENT DEVICE FOR ADJUSTING THE POSITION OF AT LEAST ONE LIGHT MODULE IN THE HOUSING OF A HEADLIGHT

(71) Applicant: HELLA GMBH & CO. KGaA, Lippstadt (DE)

(72) Inventor: Helmut Jakobsmeyer, Paderborn (DE)

(73) Assignee: Hella GmbH & Co. KGAA, Lippstadt (DE)

( * ) Notice: Subject to any disclaimer, the term of this patent is extended or adjusted under 35 U.S.C. 154(b) by 0 days.

(21) Appl. No.: 16/141,288

(22) Filed: Sep. 25, 2018

(65) Prior Publication Data
US 2019/0092217 A1   Mar. 28, 2019

(30) Foreign Application Priority Data
Sep. 25, 2017   (DE) .................. 10 2017 122 102

(51) Int. Cl.
*B60Q 1/068* (2006.01)
*B60Q 1/06* (2006.01)
*B60Q 1/04* (2006.01)

(52) U.S. Cl.
CPC ............ *B60Q 1/06* (2013.01); *B60Q 1/0466* (2013.01); *B60Q 1/0683* (2013.01)

(58) Field of Classification Search
CPC .................................................. B60Q 1/0683
USPC ...................................................... 362/512
See application file for complete search history.

(56) References Cited

U.S. PATENT DOCUMENTS

| | | | |
|---|---|---|---|
| 5,444,603 A * | 8/1995 | Otsuka ................. | B60Q 1/0683 362/273 |
| 6,315,438 B1 | 11/2001 | Shirai et al. | |
| 6,619,809 B2 * | 9/2003 | Chiang ................ | B60Q 1/0683 362/273 |
| 9,381,850 B2 | 7/2016 | Dürkopp | |
| 2001/0030875 A1 * | 10/2001 | Denley ................ | B60Q 1/0683 362/514 |
| 2004/0257828 A1 * | 12/2004 | Steinbeck ............. | B60Q 1/045 362/549 |
| 2005/0145050 A1 * | 7/2005 | Fladhammer ........ | B60Q 1/0683 74/318 |

FOREIGN PATENT DOCUMENTS

| | | |
|---|---|---|
| DE | 199 41 406 A1 | 3/2000 |
| WO | WO 2013/064164 A1 | 5/2013 |

* cited by examiner

*Primary Examiner* — Christopher M Raabe
(74) *Attorney, Agent, or Firm* — Muncy, Geissler, Olds & Lowe, P.C.

(57) ABSTRACT

An adjustment device for adjusting a position of at least one light module in a housing of a headlight, with a rotary member for at least indirectly transmitting a rotary motion to the at least one light module, wherein the rotary member at least at one point is guided through an opening in the housing and wherein for sealing the housing against the rotary member, an elastic sealing member is provided against an annular surface bordering the opening, which bears against the housing. To reduce the friction between the sealing member and the annular surface, the sealing member comprises a non-elastic annular element which is provided for abutment against the annular surface.

10 Claims, 3 Drawing Sheets

ADJUSTMENT DEVICE FOR ADJUSTING THE POSITION OF AT LEAST ONE LIGHT MODULE IN THE HOUSING OF A HEADLIGHT

This nonprovisional application claims priority under 35 U.S.C. § 119(a) to German Patent Application No. 10 2017 122 102.6, which was filed in Germany on Sep. 25, 2017, and which is herein incorporated by reference.

BACKGROUND OF THE INVENTION

Field of the Invention

The present invention relates to an adjustment device for adjusting the position of at least one light module in a housing of a headlight, having a rotary member for at least indirectly transmitting a rotary motion to the at least one light module, wherein at least at one location, the rotary member is guided through an opening in the housing, and wherein for sealing the housing against the rotary member, an elastic sealing member is provided against an annular surface bordering the opening which bears against the housing.

Description of the Background Art

From DE 199 41 406 A1, which corresponds to U.S. Pat. No. 6,315,438, an adjustment device for adjusting the position of a light module in the housing of a headlight is known. The adjustment device comprises a rotary member which is guided at one location through an opening in the housing. In order to achieve a sealing of the opening in the housing, a sealing member is provided which bears against an annular surface of the housing, which surrounds the opening. Furthermore, the rotary member penetrating the opening has sealing lips which abut against the inside of the opening to achieve a further seal. Disadvantageously, the seal provided may result in the rotary motion of the rotary member in the housing being difficult to move, in particular when the lubricant employed ages or the rotary member is not moved for an extended period of time. In order to ensure adequate sealing of the housing, in particular to prevent the penetration of moisture but also of contamination, a contact pressure of the annular element against the annular surface on the housing must be provided. Due to the high contact pressure and the friction pairing of plastic to plastic, higher friction torques result, which additionally cause the rotary motion of the rotary member in the opening of the housing to move with difficulty.

From WO 2013/064164 A1, which corresponds to U.S. Pat. No. 9,381,850, which is herein incorporated by reference, a further adjustment device for adjusting the position of a light module in the housing of a headlight is known, wherein a rotary member is guided through an opening in the housing and is sealed by a sealing member. The sealing member is formed by a rubber ring which is pressed against the annular surface inside the housing, which borders the opening in the housing.

However, in the conventional art, in particular, when the materials age and plasticizers in the rubber-elastic material of the sealing member are no longer fully effective, the rotary motion of the rotary member in the housing may move with difficulty. This resistance can lead to failure of the adjustment device. On the other hand, a certain contact pressure must be present with which the sealing member is pressed against the annular surface on the housing to achieve reliable sealing of the housing interior against external moisture and contamination.

SUMMARY OF THE INVENTION

It is therefore an object of the present invention to provide an adjustment device for adjusting the position of at least one light module in a housing of a headlight, wherein the adjustment device is preferably easy to operate over a long period of use. In particular, the passage of the rotary member through the opening in the housing is to be better sealed.

The invention includes the technical teaching that the sealing member comprises a non-elastic annular element, which is provided for abutment against the annular surface.

The sealing member can have a base body of an elastic material, and a non-elastic annular element is received in or on the sealing member, the latter being designed to directly bear against the annular surface on the housing. For example, the annular element can be made of a different material than the base body of the sealing member, which has an elastic property. Consequently, it is also possible to produce a friction pairing which is no longer based on the combination of plastic-plastic. Therefore, for example, the annular element can be made of a metallic material. Alternatively, it is also possible to make the annular element from a fibrous material, for example a composite material.

The annular element can have a disk shape. It is also possible that the annular element can have an outer diameter which is smaller than the outer diameter of the sealing member. In this case, the sealing member may have a sealing portion which projects up to the annular surface to form a sealing lip, thus surrounding the annular element on the outside. In this case, the sealing lip seals against the annular surface, without the sealing lip transmitting a higher contact pressure to the annular surface. In fact, the actual contact pressure is transmitted better via the annular element, wherein the sealing lip can serve for additional and especially primary sealing, so that in particular contaminants cannot penetrate between the annular surface and the annular element.

The annular element, can have an L-shaped ring cross-section, and a first leg of the L-shape can be in contact with the annular surface, and a second leg of the L-shape can constitute a sleeve which is formed around a shaft of the rotary member. Thereby, the annular element can be guided radially on the rotary member and at the same time, the first leg serves as a contact against the annular surface in order to transmit the corresponding contact pressure of the elastic sealing member. Moreover, no adhesive connection needs to be provided between the sealing member and the annular element since the annular element is radially guided on the sealing member by the second leg.

The annular element can be designed with a metal foil or a fiber sheet, which is arranged on the end face of the sealing member, in particular glued or vulcanized, and is in contact with the annular surface. The sealing member can bias the annular element against the annular surface due to an intrinsic elasticity so that the disk shape, the L-form or the metal foil or fiber sheet is pressed with an appropriate biasing force against the annular surface on the housing surrounding the opening. In this case, the contact surface of the annular element bearing against the annular surface can be designed flat, wherein a stepped or conical contact surface is also conceivable.

The sealing member provides that the sealing member and the annular element can be integrally formed and are made of the same material from a metallic spring plate. In this case, the spring plate may be formed such that a spring portion forms the elastic sealing member and an annular portion forms the annular element. In this case, the annular portion of the spring plate may provide a seal, wherein in particular an O-ring can be used in the opening to achieve, for example, further radial guidance of the rotary member in the opening, and to provide an additional seal. The spring plate may include a portion that holds the O-ring in position in the opening.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
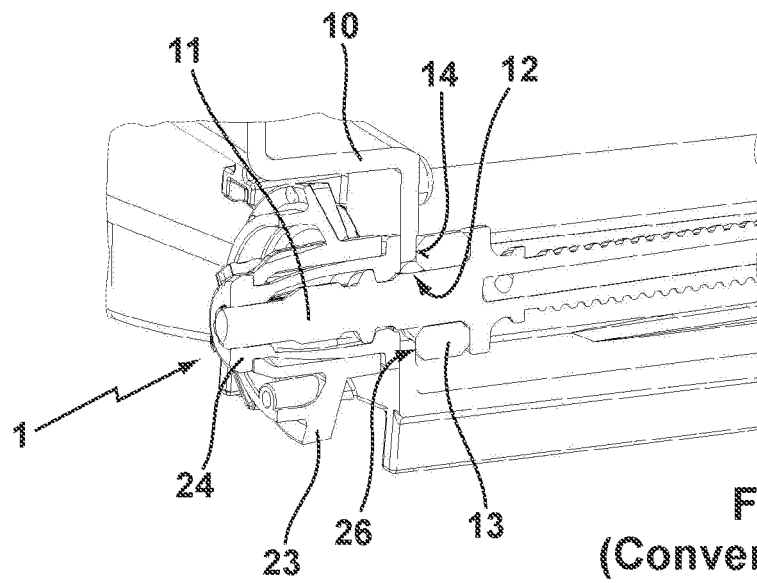
FIG. 1 illustrates an adjustment device for adjusting the position of at least one light module in the housing of a headlight according to the conventional art.

FIG. 1 shows an adjustment device 1 according to the conventional art for adjusting the position of a light module in the housing 10 of a headlight. The adjustment device 1 is shown with a rotary member 11 for at least indirectly transmitting rotary motion, the former being coupled to the light module such that the position of the light module can be changed by the rotary motion. The rotary member 11 is guided at one location through an opening 12 in the housing 10, wherein [sic—delete "durch"?] an elastic sealing member 13 is provided against an annular surface 14 bordering the opening 12 which bears against the housing to seal the housing 10 against the sealing member 11. The sealing member 13 comprises, for example, a rubber sleeve or a rubber ring, and by applying a drive means 23, for example in the form of a toothed wheel, together with a latching element 24 to the rotary member 11, the sealing member 13 can be biased such that it is pressed with an end face 26 against the annular surface 14.

The surface of the annular surface 14 as part of the housing 10 and the front 26 of the sealing member 13 each have a plastic material and/or a rubber material so that there is a friction pairing of plastic-plastic or plastic-rubber. The disadvantages described above are associated therewith, in particular, when an aging lubricant is used to lubricate the rotary motion of the sealing member 13 against the annular surface 14 of the housing 10. The sealing member 13 thereby corotates with the rotary motion of the rotary member 11 and slides off the annular surface 14 on the housing 10.

Figure 2:
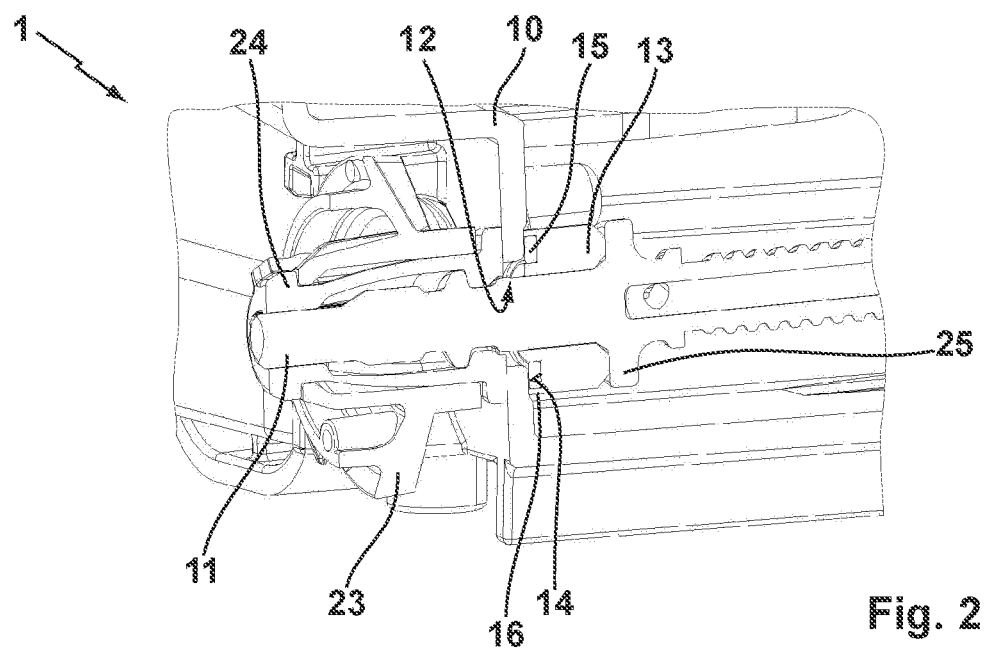
FIG. 2 illustrates an adjustment device according to the invention with a sealing member and an annular element in the form of a disk.

FIG. 2 shows the sealing member 13 for sealing the opening 12 in the housing 10, through which the rotary member 11 is guided, according to the invention. The sealing member 13 is axially biased between a shoulder 25 and the housing 10 by the drive means 23 being mounted by means of the latching means 24 on the rotary member 11 in the form of a toothed wheel. The sealing member 13 comprises an annular element 15, which is in particular made of metal. This forms the main friction partner against the annular surface 14, which borders the opening 12. On the outside of the annular element 15, the sealing member 13 has a sealing portion 16 which encloses the annular element 15 on the outside and forms a sealing lip, which also presses against the annular surface 14 with slight bias. The use of the annular element 15 essentially forms a metal-plastic friction pairing by means of which lower frictional forces are generated, and in particular, old lubricant does not lead to resistance in the friction pairing when the sealing member 13 corotates with the rotary motion of the rotary member 11.

Figure 3:
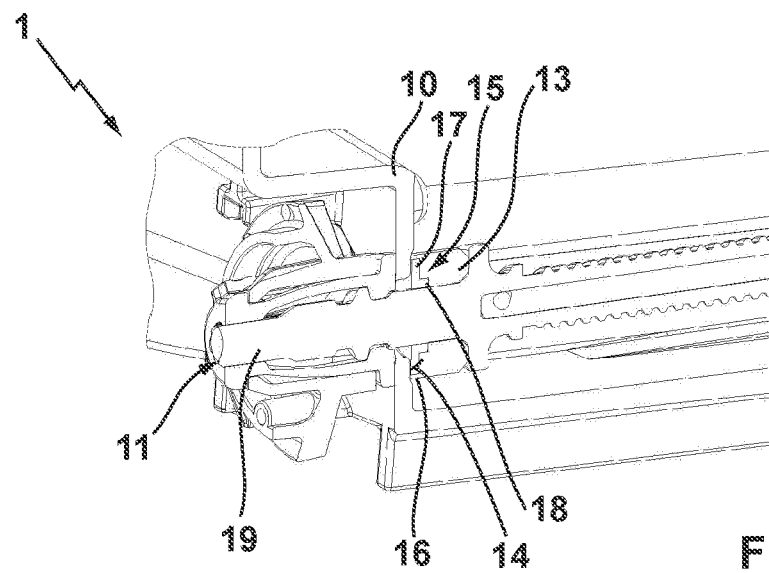
FIG. 3 illustrates an annular element in an L-shape.

FIG. 3 shows the design of the sealing member 13 according to the invention with an annular element 15 which has an L-shape. As a result, the annular element 15 forms a first leg 17 which is in contact with the annular surface 14, and the annular element 15 forms a second leg 18 which forms a sleeve about a shaft 19 of the rotary member 11. As a result, the annular element 15 is centered on the rotary member 11 and is held in the position shown. In the same way, with this illustrated embodiment of the annular element 15, the sealing member 13 may also have a sealing portion 16 in contact with the annular surface 14.

Figure 4:
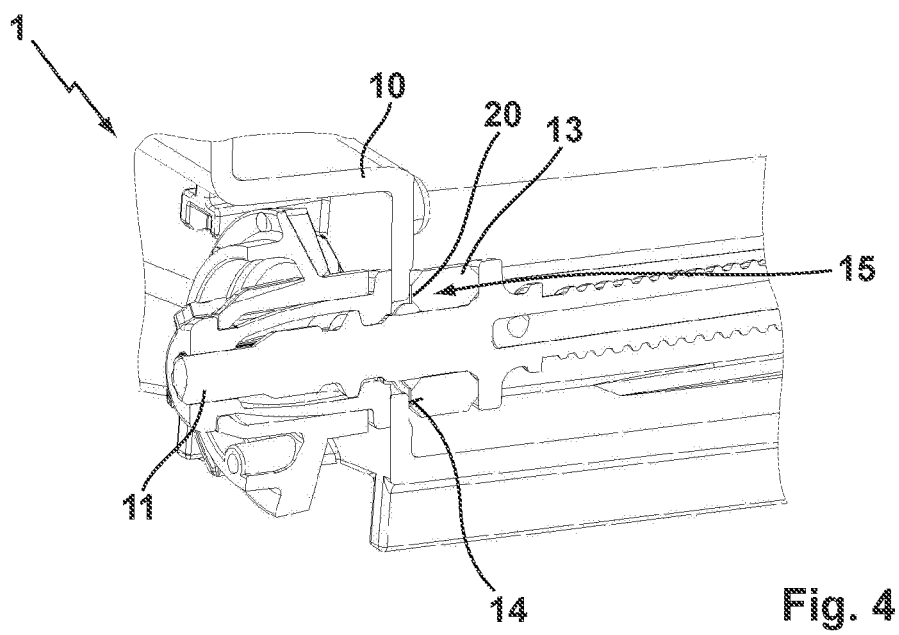
FIG. 4 illustrates an annular element in the form of a metal foil or fiber sheet.

FIG. 4 shows the adjustment device 1 with a sealing member 13 for sealing the passage of the rotary member 11 through the opening 12 in the housing 10, and the sealing member 13 comprises an annular element 15 in contact with the annular surface 14 which is formed as a metal film or fiber sheet 20 and thus has a very thin cross-section. As a result, the annular element 15 can adapt to the unevenness of the annular surface 14 and slide over it. The fiber sheet 20 for forming the annular element 15 may, for example, be affixed to the end face of the sealing member 13, or, the rubber material of the sealing member 13 is vulcanized to the fiber sheet 20.

Figure 5:
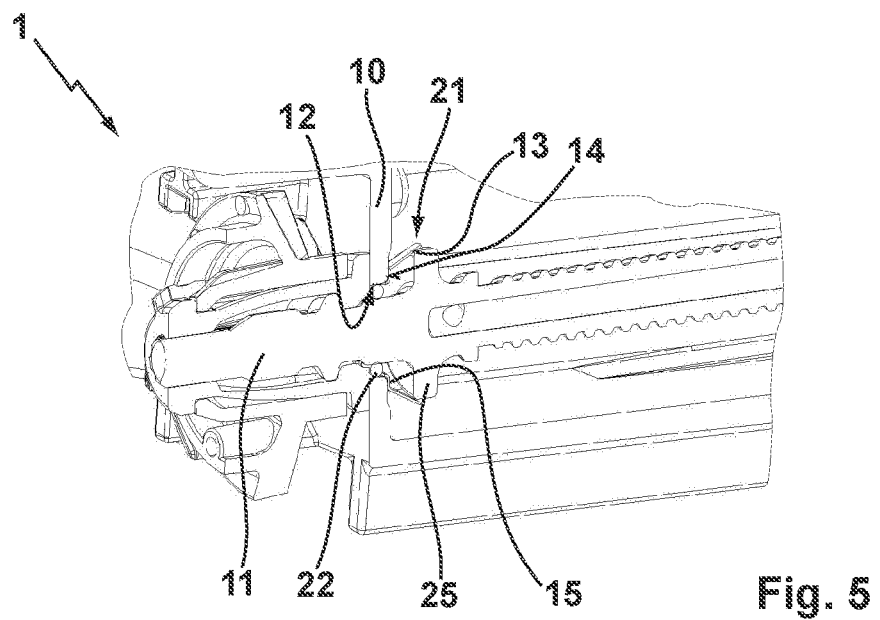
FIG. 5 illustrates an annular element which is formed together with the sealing member by means of a spring plate.

Lastly, FIG. 5 shows an adjustment device 1 with a rotary member 11 guided through the opening 12 in the housing 10, and the sealing member 13 is designed in the form of a metallic spring plate 21. The spring plate 21 in this case has a spring portion which forms the elastic sealing member 13, and the spring plate 21 has an annular portion which forms the annular element 15. In addition, an O-ring 22 is inserted in the opening 12 to achieve a further sealing effect. The spring portion for forming the elastic sealing member 13 is supported against a shoulder 25, which is formed on the rotary member 11. The spring plate 21 may comprise a spring steel, and the inner portion for forming the annular element 15 may be designed such that it holds the O-ring 22 in the position shown.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. An adjustment device for adjusting a position of at least one light module in a housing of a headlight, the adjustment device comprising:

a rotary member for at least indirectly transferring a rotary motion to the at least one light module, wherein at least at one location, the rotary member is guided through an opening in the housing;

an elastic sealing member which bears against an annular surface bordering the opening in the housing, the sealing member sealing the housing against the rotary member; and a non-elastic annular element that is provided to bear against the annular surface, wherein the annular surface is formed by a single surface of the housing, wherein the annular element has an outer diameter which is smaller than the outer diameter of the sealing member, wherein the sealing member has a sealing portion which projects up to the annular surface to form a sealing lip, thus enclosing the annular element on the outside, and wherein both the sealing portion of the sealing member and the annular element directly contact the annular surface.

2. The adjustment device according to claim 1, wherein the annular element comprises a metallic material.

3. The adjustment device according to claim 1, wherein the annular element has a disk shape.

4. The adjustment device according to claim 1, wherein the annular element has an L-shaped annular cross section, wherein a first leg is in contact with the annular surface and wherein a second leg forms a sleeve around a shaft of the rotary member.

5. The adjustment device according to claim 4, wherein the second leg directly contacts the shaft.

6. The adjustment device according to claim 3, wherein the annular element forms a metal foil or a fiber sheet which is arranged at an end face of the sealing member and is in contact with the annular surface.

7. The adjustment device according to claim 1, wherein the sealing member is biased against the annular surface due to an intrinsic elasticity of the annular element.

8. An adjustment device for adjusting a position of at least one light module in a housing of a headlight, the adjustment device comprising:

a rotary member for at least indirectly transferring a rotary motion to the at least one light module, wherein at least at one location, the rotary member is guided through an opening in the housing; and a metallic spring plate which bears against an annular surface bordering the opening of the housing, the metallic spring plate sealing the housing against the rotary member, wherein the metallic spring plate includes a spring portion that forms a sealing member and an annular portion that directly bears against the annular surface of the housing, and wherein the spring portion angularly extends from the annular portion in a direction away from the annular surface.

9. The adjustment device according to claim 8, wherein an O-ring is inserted in the opening.

10. The adjustment device according to claim 9, wherein the O-ring is held via the annular portion of the metallic spring plate.

* * * * *